United States Patent
Buckley

(10) Patent No.: US 10,711,778 B2
(45) Date of Patent: Jul. 14, 2020

(54) FRAC PUMP VALVE ASSEMBLY

(71) Applicant: ST9 Gas and Oil, LLC, The Woodlands, TX (US)

(72) Inventor: Chris Buckley, Tomball, TX (US)

(73) Assignee: ST9 GAS AND OIL, LLC, The Woodland, TX (US)

( * ) Notice: Subject to any disclaimer, the term of this patent is extended or adjusted under 35 U.S.C. 154(b) by 143 days.

(21) Appl. No.: 15/956,681

(22) Filed: Apr. 18, 2018

(65) Prior Publication Data

US 2018/0298893 A1 Oct. 18, 2018

Related U.S. Application Data

(60) Provisional application No. 62/486,802, filed on Apr. 18, 2017.

(51) Int. Cl.
*F04B 53/10* (2006.01)
*F16K 25/00* (2006.01)

(52) U.S. Cl.
CPC ........ *F04B 53/108* (2013.01); *F04B 53/1075* (2013.01); *F04B 53/1087* (2013.01); *F16K 25/005* (2013.01); *F04B 2201/0603* (2013.01)

(58) Field of Classification Search
CPC ................ F04B 53/108; F04B 53/1087; F04B 53/1075; F04B 2201/0603; F16K 25/005
USPC .................................. 251/332, 334
See application file for complete search history.

(56) References Cited

U.S. PATENT DOCUMENTS

| | | | | |
|---|---|---|---|---|
| 2,495,880 A | * | 1/1950 | Volpin | F04B 53/1027 137/516.29 |
| 2,985,424 A | * | 5/1961 | Anderson | F16K 1/34 251/332 |
| 3,419,041 A | * | 12/1968 | Jennings | F04B 53/102 137/533.19 |
| 3,489,170 A | * | 1/1970 | Leman | F16K 1/385 137/516.29 |
| 3,746,305 A | * | 7/1973 | Zakka | F16K 1/422 251/360 |
| 4,518,329 A | * | 5/1985 | Weaver | F04B 53/1027 137/516.25 |
| 4,662,392 A | * | 5/1987 | Vadasz | F16K 15/04 137/533.11 |
| 4,867,338 A | * | 9/1989 | Bingham | F16J 15/0806 220/378 |
| 5,052,435 A | * | 10/1991 | Crudup | F16K 15/063 137/516.29 |
| 5,088,521 A | * | 2/1992 | Johnson | E21B 21/01 137/516.29 |
| 5,275,204 A | * | 1/1994 | Rogers | F04B 53/1027 137/516.29 |
| 5,297,580 A | * | 3/1994 | Thurman | F04B 53/1002 137/533.15 |

(Continued)

*Primary Examiner* — John Bastianelli

(57) ABSTRACT

A valve assembly includes a valve body, a seal, and a supplemental material. The valve assembly configured to reduce the effects of wear and erosion of the seal and valve body by including material with increased hardness. The supplemental material has a higher hardness level than the valve body and is inserted on the contact surface of the valve body. The seal can include a plurality of materials, each having different hardness levels. The location of the supplemental material can vary and the overall radial distribution on the contact surface may vary.

21 Claims, 3 Drawing Sheets

(56) References Cited

U.S. PATENT DOCUMENTS

| | | | | |
|---|---|---|---|---|
| 6,641,112 B2* | 11/2003 | Antoff | ............... | F04B 53/1025 |
| | | | | 251/363 |
| 7,222,837 B1* | 5/2007 | Blume | ............... | F16K 1/385 |
| | | | | 137/516.29 |
| 7,513,483 B1* | 4/2009 | Blume | ............... | F16K 1/34 |
| | | | | 137/516.29 |
| 7,591,450 B1* | 9/2009 | Blume | ............... | F16K 1/34 |
| | | | | 251/332 |
| 8,141,849 B1* | 3/2012 | Blume | ............... | F16K 1/34 |
| | | | | 137/516.29 |
| 8,312,805 B1* | 11/2012 | Blume | ............... | F16J 1/008 |
| | | | | 277/560 |
| 9,291,274 B1* | 3/2016 | Blume | ............... | F16K 1/46 |
| 2014/0124692 A1* | 5/2014 | Baumann | ............... | F16K 1/38 |
| | | | | 251/332 |

* cited by examiner

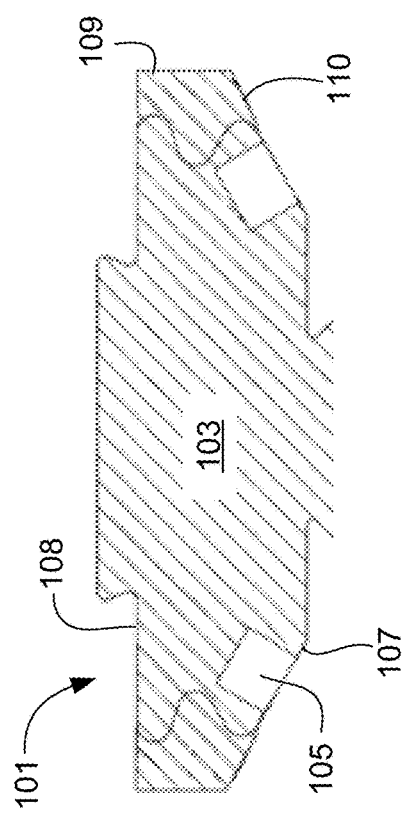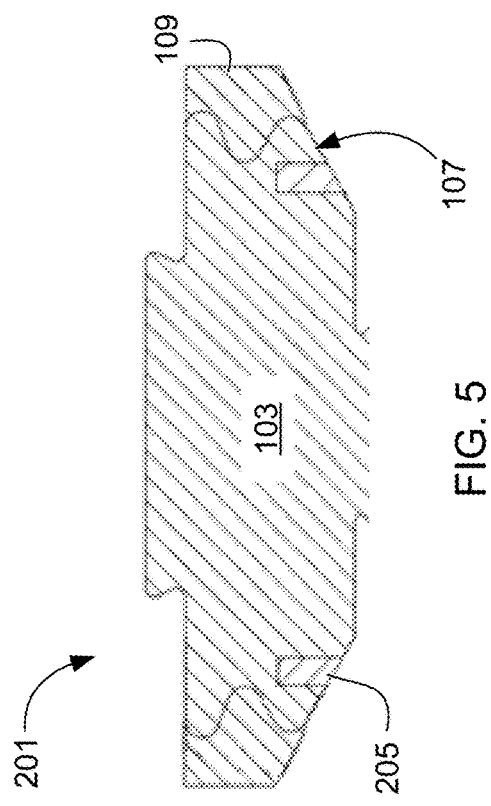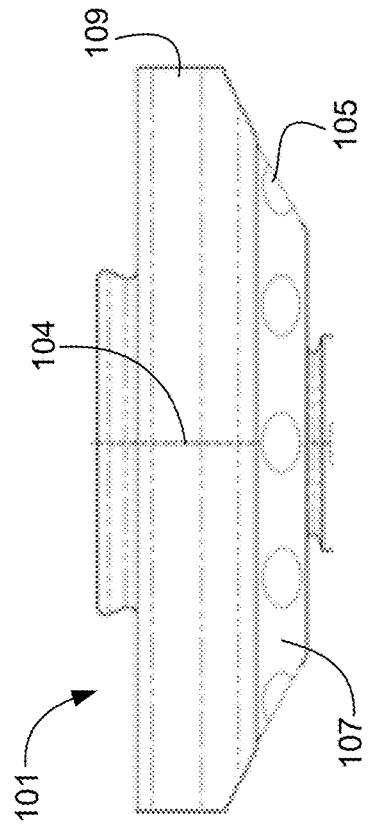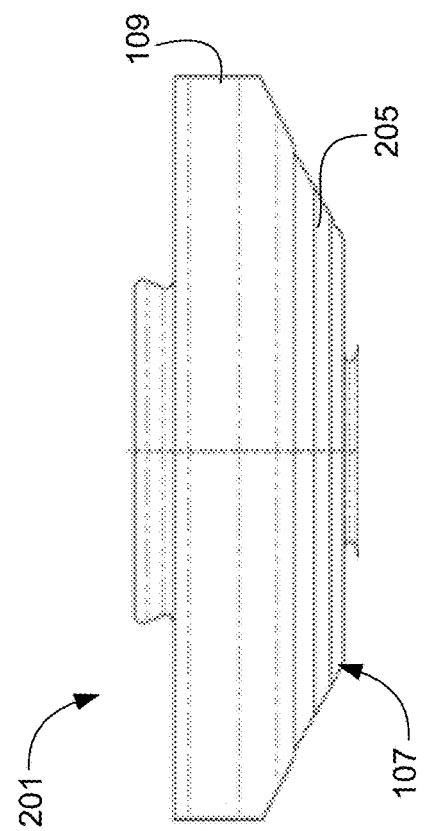

FRAC PUMP VALVE ASSEMBLY

CLAIM OF PRIORITY

This application claims the benefit of U.S. Provisional Application No. 62/486,802 filed 18 Apr. 2017. The information contained therein is hereby incorporated by reference.

BACKGROUND

1. Field of the Invention

The present application relates generally to a reciprocating pump, and in particular to a valve assembly for use with either a suction or discharge valve in a fluid end.

2. Description of Related Art

Hydraulic fracturing can increase the rate of production of oil and gas from low-permeability reservoirs. Hydraulic fracturing increases the permeability of reservoir rocks by opening channels through which oil and gas can travel to recovery wells. During hydraulic fracturing, a fluid is pumped through a wellbore under high pressure into a subterranean reservoir where it splits or fractures the reservoir rock. A proppant, like sand, is often added to the pumped fracture fluid and carried in suspension into the newly formed fractures. When pumping ceases, the fractures partially close on the proppant, leaving open channels for oil and gas to flow to the recovery well, i.e., the wellbore through which the fracture fluid was originally pumped.

High-pressure pumps are used to complete hydraulic fracturing procedures or "frac jobs." These pumps have "fluid ends" within which a number of reciprocating plungers pressurize the fracture fluid. Suction and discharge valves control fluid flow to, and from, the plungers. These valves selectively contact a seat thereby regulating movement of the fracture fluid through the fluid end.

A number of issues can arise with conventional valves in fluid ends. Each valve is subjected to the course contaminants within the fracture fluid and the repetitive or cyclical contacting of the seat. Over time, the combination of the course fracture fluid with the repetitive contact forces from the seat can lead to premature wear, eroding, and fracturing of the valve during operation. Additionally, a relatively uniform seal is located around a periphery of the valve. The seal acts to restrict the passage of fracture fluid passed the valve when seated. The same course contaminants tend to wear the seal resulting in erosion and the development of fractures therein. The constant repetitive impacting of the valve surface on the seat can greatly damage the valve surface immediately adjacent to the seal area as the transition between materials occurs.

Although great strides have been made with respect to fluid ends and valves, considerable shortcomings remain. An improved valve assembly is needed to mitigate damage from the contaminants in the fracture fluid.

SUMMARY OF THE INVENTION

It is an object of the present application to provide a column or insert of a supplemental material onto a surface of the valve to minimize the effects of wear, erosion, and fracture from the contaminants and pressures inside the fluid end. The hardness of the supplemental material being greater than the hardness of the valve body.

It is a further object of the present application to provide a valve assembly configured to include a dual material seal on the valve body to also mitigate the effects of wear, erosion, and fracture around the periphery of the valve. The dual seal material The dual seal includes a first material and a second material. Each has different hardness levels. The hardness level of the second material is greater than the first material. The material with the higher hardness level is adjacent the contact surface of the valve body. Ultimately the invention may take many embodiments. In this way, this assembly overcomes the disadvantages inherent in the prior art.

The more important features of the assembly have thus been outlined in order that the more detailed description that follows may be better understood and to ensure that the present contribution to the art is appreciated. Additional features of the system will be described hereinafter and will form the subject matter of the claims that follow.

Many objects of the present assembly will appear from the following description and appended claims, reference being made to the accompanying drawings forming a part of this specification wherein like reference characters designate corresponding parts in the several views.

Before explaining at least one embodiment of the system in detail, it is to be understood that the assembly is not limited in its application to the details of construction and the arrangements of the components set forth in the following description or illustrated in the drawings. The assembly is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present system. It is important, therefore, that the claims be regarded as including such equivalent constructions insofar as they do not depart from the spirit and scope of the present system.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

FIG. 2 is a side view of the valve assembly of FIG. 1.

FIG. 3 is a side section view of the valve assembly of FIG. 2.

FIG. 4 is a side view of an alternative embodiment of the valve assembly of FIG. 2.

FIG. 5 is a side section view of the valve assembly of FIG. 4.

Figure 1:
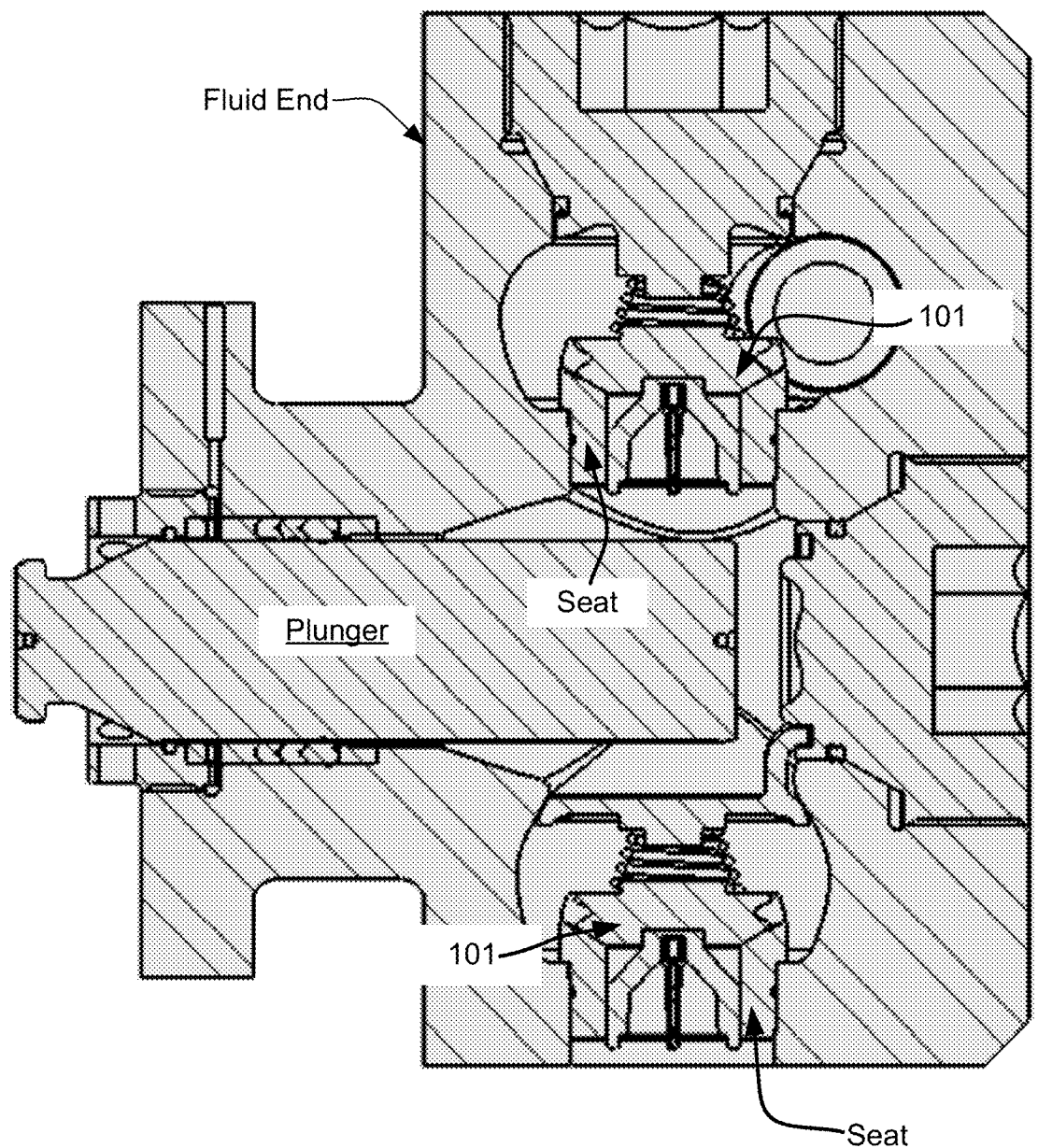
FIG. 1 is a fragmentary perspective view showing a valve assembly of a fluid end seated into a seat according to an embodiment of the present application.

While the assembly and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the assembly described herein may be oriented in any desired direction.

The assembly in accordance with the present application overcomes one or more of the above-discussed problems commonly associated with conventional valves in fluid ends. Specifically, the valve assembly of the present application is configured to provide a column or insert of a supplemental material onto a surface of the valve to minimize the effects of wear, erosion, and fracture from the contaminants and pressures inside the fluid end. Additionally, the valve assembly is configured to include a dual material seal on the valve body to also mitigate the effects of wear, erosion, and fracture around the periphery of the valve. These and other unique features of the device are discussed below and illustrated in the accompanying drawings.

The assembly and method will be understood, both as to its structure and operation, from the accompanying drawings, taken in conjunction with the accompanying description. Several embodiments of the assembly may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The assembly and method of the present application is illustrated in the associated drawings. The assembly includes a valve body, a seal, and a supplemental material. The supplemental material is inserted into the contact surface of the valve body. The seal wraps around the periphery of the valve body. The seal may include one or more materials having different hardness levels. Additional features and functions of the device are illustrated and discussed below.

Referring now to the Figures wherein like reference characters identify corresponding or similar elements in form and function throughout the several views. The following Figures describe the assembly of the present application and its associated features. With reference now to the Figures, an embodiment of the modular observation assembly and method of use are herein described. It should be noted that the articles "a", "an", and "the", as used in this specification, include plural referents unless the content clearly dictates otherwise.

Referring now to FIG. 1 in the drawings, a fragmentary perspective view showing a valve assembly of a fluid end seated into a seat is illustrated. Fracture fluid is configured to enter and leave the fluid end as a plunger is reciprocated between two positions. The plunger and fluid end operate to pressurize the fracture fluid for use in completing hydraulic fracturing procedures. The fracture fluid enters through a suction valve and leaves in a pressurized state through a discharge valve. Each valve opens and closes to regulate movement of the fracture fluid through the fluid end as the plunger reciprocates. The valves repeatedly contact the surface of the valve seat and are subjected to the continuous wear from the fracture fluid.

Referring now also to FIGS. 2 and 3 in the drawings, a first embodiment of the valve assembly 101 is illustrated. As stated previously, valves 101 within fluid ends experience large amounts of stress, pressure and abrasion. Valves can be susceptible to failure under these conditions. The combination of contact forces with the valve seat with the coarseness of the fracture fluid can generate a harsh environment for the valve. Assembly 101 includes a valve body 103, a supplemental material insert 105, and a seal 109. The combination of these members acts to minimize the effects of stresses due to the coarseness of the working fluid.

Assembly 101 alternates between an open position and a closed position within the fluid end. When closed, body 103 contacts a valve seat along contact surface 107. Surface 107 experiences a majority of the stresses. Seal 109 is coupled to body 103 around the periphery of body 103 between contact surface 107 and upper surface 108. Seal 109 acts to define the width of assembly 101. As seen in the Figures, seal 109 includes a contact surface 110 that is relatively parallel and planar to contact surface 107 to form a total contact area to mate with the valve seat. Surface 110 is also exposed to the stresses of contact and abrasion from the working fluid.

The supplemental material 105 is configured to provide greater resistance to effects of wear, erosion, and fracture from operation of the fluid end. The hardness level of supplemental material 105 is greater than the hardness level of body 103. An example of a suitable material for material 105 would be a carbide, Tungsten, or even a composite material. The material selected should be harder than body 103. It is desired that the type of material be selected so as to limit the amount of dimensional fluctuation as possible as a result of temperature fluctuations.

Supplemental material 105 may be used in varied areas, orientations, and make up any volumetric ratio compared to conventional steel materials commonly used. As seen in FIGS. 2 and 3, valve body 103 includes a plurality of piles/columns of supplemental material 105. Material 105 is inserted into predrilled holes along the contact surface 107 between valve body 103 and the valve seat. The supplemental material 105 may be heat shrunk into the holes and trimmed flush with the contact surface 107. Alternatively, material 105 may be bonded in place as well. As seen in FIG. 2, the plurality of columns of material 105 are radially located around the contact surface 107 of the valve body 103 about a valve axis 104. A section view of two such columns are provided in FIG. 3. The columns may reach any desired depth within the valve body 103. Contact with the valve seat is distributed through material 107 which is more resistant to wear then the remaining materials of valve body 103.

Referring now also to FIGS. 4 and 5 in the drawings, an alternative embodiment of valve 101 is illustrated. Valve 201 is similar in form and function to that of valve 101 except as herein noted. Valve 201 includes supplemental material 205 but wherein the supplemental material is arranged in a continuous circular ring pattern around contact surface 107. As seen in FIG. 5, the ring of supplemental material 205 extends within valve body 103 to a selected depth. It should be understood that many types of embodiments are conceivable. Supplemental material 205 may be distributed in any shape, depth or contour along the face of contact surface 107 as deemed necessary to bring about the performance requirements necessary.

It should be noted that the angle at which the hole for the supplemental material is oriented relative to the face of contact surface 107 may be varied. In FIG. 3, the hole for the material 105 was perpendicular to contract surface 107 while FIG. 5 shows the groove for material 105 is non perpendicular to the contact surface 107. The particular orientation may be dictated by shape of the supplemental material or other design constraints. It is also noted that seal 109 is separated from material 105. Contact surface 107 extends there between both seal 109 and material 105.

Figure 6:
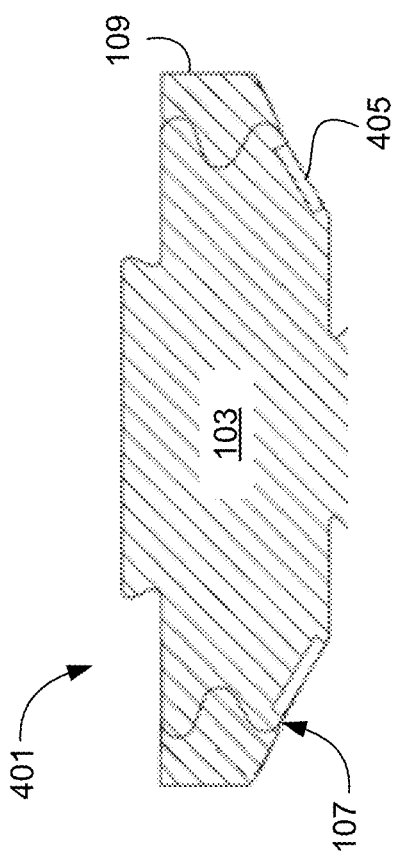
FIGS. 6-7 are side section views of additional alternative embodiments of the valve assembly of FIG. 1.
Figure 7:
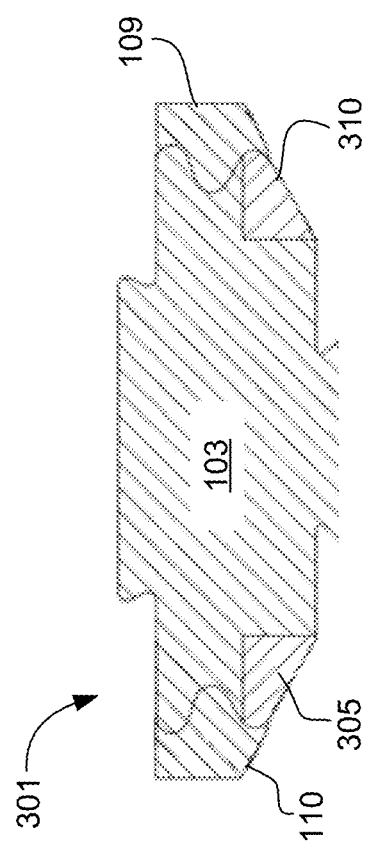

Referring now also to FIGS. 6 and 7 in the drawings, additional section views of alternative configurations and styles of supplemental material 105 associated with valve assembly 101 are illustrated. As seen in FIG. 6, a section view of valve assembly 301 is illustrated. Valve assembly 301 is similar in form and function to that of valve 101/201 except as herein noted. Assembly 301 includes supplemental material 305 directly abutting seal 109 and extending the full height/length of contact surface 107, such that contact surface 107 is replaced by contact surface 310 of the supplemental material 305 and contact surface 110 of seal 109. In FIG. 7, a section view of valve assembly 401 is illustrated. Valve assembly 401 is similar in form and function to that of valve 101/201 except as herein noted. Assembly 401 includes supplemental material 405 is shown in a shallow configuration.

Within any of the above embodiments, supplemental material 105 is configured to serve as a more resistant material than valve body 103 so as to optimize the total performance of the valve by reducing the effects of wear, erosion and fracture. The forces are distributed through material 105 as well as body 103 and seal 109.

Figure 8:
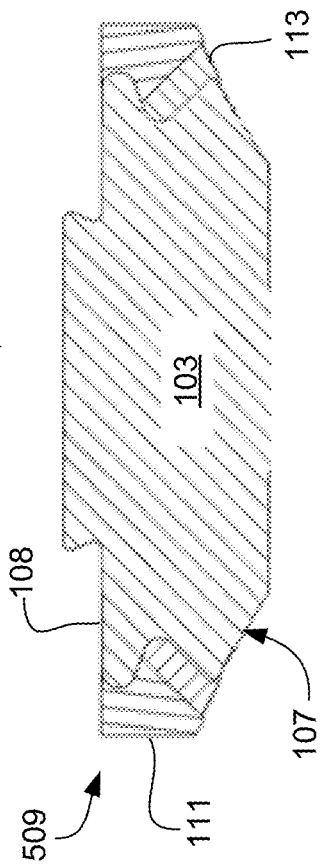
FIG. 8 is an alternative side view of the valve assembly of FIG. 1 without a supplemental material.
Figure 9:
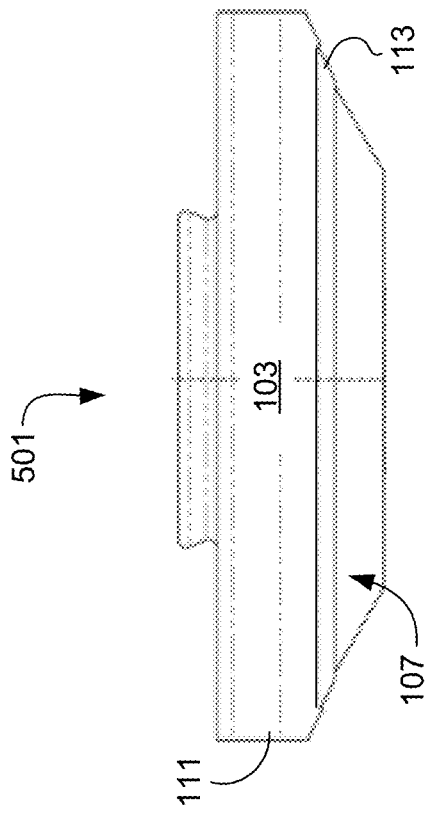
FIG. 9 is a section view of the valve assembly of FIG. 8.

Referring now also to FIGS. 8 and 9 in the drawings, a dual valve seal is illustrated. FIGS. 8 and 9 illustrate valve assembly 501 which is similar in form and function to assembly 101/201. Valve assembly 501 is illustrated without material 105 for the purposes of clarity but includes dual seal 509. It is understood that valve 101, 201, 301 may include dual seal 509. Seal 109 in FIGS. 2-7 are shown as a uniform material as focus was given to the description of material 105. Dual valve seal 509 is configured to pass around the periphery of valve body 103 and is used to ensure a seal between valve 101/201 and the valve seat.

The materials of seal 509 have different properties, such that when used in conjunction with the valve body 103, they combine to optimize the total performance of the valve by reducing the effects of wear, erosion and fracture on the seal. This is achieved by mitigating the effects of the mating part to valve within a medium and or fluid during its operation. Seal 509 includes at least two different materials having different material properties. Seal 509 includes a first material 111 having a first hardness level and is such as may typically be seen with conventional valves. Seal 509 further includes a second material 113 having a second hardness level greater than the first hardness level of material 111 and is a more hardened or abrasion resistant material than first material 111. An example of seal 509 may be a dual urethane material. More materials 111 and 113 may be made from the same or dissimilar materials. In some embodiments, a singular material could even be used wherein the material has a hardness gradient that is different depending on the relative location relative to body 103.

Where more than one material is used, the harder material is located adjacent body 103 at surface 107. Material 113 is located adjacent body 103 at contact surface 107 as it is the first portion of seal 109 that contacts the fracture fluid passing beyond the valve. This lower edge of the valve body adjacent seal 109 experiences a considerable amount of abrasion from the fracture fluid. By incorporating a dual hardness seal 509, the second material 113 is configured to resist stresses and abrasion and the overall seal performance is improved. As with material 105, the precise materials and associated geometry may vary between conceived embodiments as seen in the prior embodiments.

The current application has many advantages over the prior art including at least the following: (1) two-manner stabilization of an elevated platform; (2) modular capability; (3) safe, fast, and easy to operate; and (4) easily portable.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A valve assembly, comprising:
   an annular valve body having a first hardness and formed of an upper surface, a bottom surface spaced apart from the upper surface, a lower contact surface extending from the bottom surface and angled towards the upper surface, and an outer peripheral edge formed between the upper surface and the lower contact surface;
   an annular seal disposed on at least a portion of the peripheral edge;

at least one cavity formed in the annular valve body along the angled lower contact surface; and a supplemental material insert disposed in each cavity formed in the lower contact surface, the supplemental material insert having a second hardness that is greater than the first hardness.

2. The assembly of claim 1, wherein the at least one cavity is an annular cavity extending about the valve body and the supplemental material insert is an annular ring.

3. The assembly of claim 1, wherein the supplemental material insert is a carbide.

4. The assembly of claim 1, wherein the at least one cavity is a plurality of cavities radially spaced apart from one another about the lower contact surface, with each spaced apart cavity having a supplemental material insert being inserted into the cavity.

5. The assembly of claim 4, wherein each of the plurality of cavities is spaced apart from the peripheral edge of the annular body.

6. The assembly of claim 1, wherein the supplemental material insert abuts a portion of the seal.

7. The assembly of claim 1, wherein the cavity is spaced apart from the peripheral edge and the bottom surface so that the supplemental material insert is separated from the seal.

8. The assembly of claim 1, wherein the cavity is spaced apart from the annular seal and the bottom surface.

9. The assembly of claim 4, wherein a plurality of cavities are each a circular bore extending along an axis.

10. The assembly of claim 9, wherein the axis of each cavity is substantially, perpendicular to the lower contact surface.

11. The assembly of claim 9, wherein the axis of each cavity is substantially perpendicular to the upper surface.

12. The assembly of claim 1, wherein the cavity is an annular groove formed in the angled lower contact surface.

13. The assembly of claim 1, wherein the seal comprises a contact surface that is substantially co-planar with the angled lower contact surface and the supplemental material insert is substantially flush with the lower contact surface.

14. The assembly of claim 1, wherein the annular seal extends from the upper to the angled lower contact surface.

15. A valve assembly, comprising:

an annular valve body having a first hardness and formed of an upper surface, a bottom surface spaced apart from the upper surface, a lower contact surface extending from the bottom surface and angled towards the upper surface, and an outer peripheral edge formed between the upper surface and the lower contact surface;

an annular seal disposed on at least portion of the peripheral edge;

at least one cavity formed in the valve body along the angled lower contact surface, the cavity spaced apart from the bottom surface and the peripheral edge; and a supplemental material insert disposed in the at least one cavity, the supplemental material insert having a second hardness that is greater than the first hardness.

16. The assembly of claim 15, wherein the at least one cavity is an annular cavity extending about the valve body; and the supplemental material insert is a ring disposed in the annular cavity.

17. The assembly of claim 16, wherein the annular cavity is spaced apart from the peripheral edge and the supplemental material insert ring is substantially flush with the lower contact surface.

18. The assembly of claim 15, wherein the at least one cavity is an annular groove formed in the lower contact surface; and the supplemental material insert is a ring disposed in the annular cavity.

19. The assembly of claim 18, wherein the supplemental material insert ring abuts a portion of the seal.

20. The assembly of claim 15, wherein the at least one cavity comprises a plurality of cavities formed in the valve body along the lower contact surface and radially spaced apart from one another about the lower contact surface, the plurality of cavities extending about the valve body; and wherein a supplemental material insert is disposed in each of the plurality of cavities, each supplemental material insert having a second hardness that is greater than the first hardness.

21. The assembly of claim 15, wherein the annular seal extends from the upper to the angled lower contact surface.

* * * * *